United States Patent
Sage et al.

(10) Patent No.: US 7,270,770 B2
(45) Date of Patent: *Sep. 18, 2007

(54) TRIBOLUMINESCENT MATERIALS AND DEVICES

(75) Inventors: Ian C Sage, Malvern (GB); Grant H Bourhill, Glos (GB); Iain Oswald, Edinburgh (GB)

(73) Assignee: Qinetiq Limited, London (GB)

(*) Notice: Subject to any disclaimer, the term of this patent is extended or adjusted under 35 U.S.C. 154(b) by 55 days.

This patent is subject to a terminal disclaimer.

(21) Appl. No.: 10/486,976

(22) PCT Filed: Aug. 8, 2002

(86) PCT No.: PCT/GB02/03660

§ 371 (c)(1),
(2), (4) Date: Jul. 21, 2004

(87) PCT Pub. No.: WO03/016429

PCT Pub. Date: Feb. 27, 2003

(65) Prior Publication Data

US 2004/0245504 A1 Dec. 9, 2004

(30) Foreign Application Priority Data

Aug. 14, 2001 (GB) ................. 0119726.8

(51) Int. Cl.
*C09K 11/06* (2006.01)
(52) U.S. Cl. ............... 252/301.16; 428/343; 428/352; 428/537.5; 428/690; 556/14; 556/40; 156/67

(58) Field of Classification Search ............ 428/690, 428/917, 375, 352, 537.5, 343; 252/301.16; 556/14, 40; 156/67
See application file for complete search history.

(56) References Cited

U.S. PATENT DOCUMENTS

| | | | |
|---|---|---|---|
| 3,075,853 A | 1/1963 | Striker et al. | 428/343 |
| 3,551,345 A | 12/1970 | Schutten | 252/301.18 |
| 5,658,494 A | 8/1997 | Bell et al. | 252/301.18 |
| 5,858,495 A | 1/1999 | Lohman et al. | 428/40.1 |
| 5,905,260 A | 5/1999 | Geddes et al. | 250/306 |
| 2004/0233347 A1* | 11/2004 | Sage et al. | 349/56 |

FOREIGN PATENT DOCUMENTS

| | | |
|---|---|---|
| EP | 0 556 005 A | 8/1993 |
| EP | 0 744 451 A | 11/1996 |
| GB | 2 232 119 A | 12/1990 |
| GB | 2 325 883 A | 12/1998 |
| JP | 01-256584 | * 10/1989 |
| WO | 98/58037 A | 12/1998 |

OTHER PUBLICATIONS

Kalinovskaya et al., Zhurnal Neoganicheskoi khimii, 38(2), 288-90 (Russian) 1993.*

(Continued)

*Primary Examiner*—Rena Dye
*Assistant Examiner*—Camie S. Thompson
(74) *Attorney, Agent, or Firm*—Nixon & Vanderhye P.C.

(57) ABSTRACT

This invention relates to various phosphine oxides and their use in applications which exploit the triboluminescent effect.

15 Claims, 3 Drawing Sheets

OTHER PUBLICATIONS

Brandl H; "Das Phaenomen Der Triboluminszenz"; MatHemathische und Naturwissenschaftliche Unterricht, Duemmler, Bonn, DE, pp. 195-202, XP001078983.

Dickinson; "Photon-Emission From Peeling Pressure Sensitive Adhesives"; Proceeding of the SPIE, SPIE, Bellingham, VA, US, vol. 910, 1998, pp. 13-20, XP001078985.

Wenxiang et al; "Triboluminescent Complexes Of Rare Earth (I)—Ternary Complexes Of SM3+, EU3+, TB3+ With Thenoyltrifluoroacetone And Triphenylphoshine Oxide"; Beijing Shifan Daxue Xuebao, Ziranshifan BAN—Journal of Natural Science of Beijing Normal University, Beijing Sheifan Daxue, Beijing, CN, no. , 1990, pp. 39-44, XP001115073.

Patent Abstracts of Japan, vol. 014, No. 014 (C-674), Jan. 12, 1990, & JP 01 256584 A, Oct. 13, 1989, Abstract.

Zhu Wenxiang et al; "Triboluminescent Complexes Of Rare Earth. (I). Ternary Complexes Of Samarium (3+), Europium (3+) And Terbium (3+) With Thenoyltrifluoroacetone And Triphenylphosphine Oxide"; Caplus, XP002217570.

Chemical Abstract 128:148933, see cpd. With Registry No. 202262-96-2.

Chemical Abstracts 101:45857, see cpds. With Registry Nos. 90846-63-2 and 90654-70-9.

Chemical Abstracts 103:2264694, see cpd. With Registry No. 98645-56-8.

* cited by examiner

TRIBOLUMINESCENT MATERIALS AND DEVICES

This application is the US national phase of international application PCT/GB02/03660, filed in English on 8 Aug. 2002, which designated the US. PCT/GB02/03660 claims priority to GB Application No. 0119726.8 filed 14 Aug. 2001. The entire contents of these applications are incorporated herein by reference.

This invention relates to novel Triboluminescent (TL) materials and their use in devices which exploit the triboluminescent effect.

Triboluminescent materials are known—(L M Sweeting & J L Guido, J. of Luminescence, 33, (1985), p 167, N Kitamura et al, Chem Phys Letts, 125, (1986), p 360, B P Shandra, et al Pramana—J Phys, 29, (1987), p 399, C R Hurt, et al Nature, 212, (1966), p 179; L M Sweeting & A L Rheingold, J Am Chem Soc, 109, (1987), p 2652 M B Hocking, et al, J. of Luminescence, 43, (1989), p 309). Chinese Chemical Letters, vol 11, no 7 pp 635-38, 2000 discloses a number of compounds that exhibit mechanoluminescence (ML). The property of mechanoluminescence is effectively the same property as triboluminescence. More specifically two 1:1 binuclear (europium and lanthanum) β-diketonate complexes are disclosed. The complexes further comprise 1,10-phenanthroline and an anion of thenoyl-trifluoroacetone (HTTA). Soden in J. Appl. Phys., 32, (1961) 750 discloses the effects of rare-earth substitutions on the fluorescence of Terbium Hexa-Antipyrine tri-iodide.

Triboluminescence is the effect seen when a material emits light when particles of the material are damaged/fractured or strained.

PCT GB96/02778 and corresponding U.S. Pat. No. 5,905,260 describe the use of triboluminescent compounds in an environment where they are used to detect damage to objects.

The following references disclose a number of fluorescent materials: EP 0744451, EP 0556005, U.S. Pat. No. 5,658,494, U.S. Pat. No. 3,551,345, PCT/GB98/01773, chemical abstracts 128:148933, 103:226494, 101:45857.

Preferably for use in damage sensing equipment triboluminescent compounds exhibit some or all of the following properties:

Bright emission

High stability to temperature and high melting point

Compatibility with structural and adhesive resins

Emission at wavelengths which are different from those provided by known materials Emission of light having other features distinguishable from known materials, such as luminescence lifetime, bandwidth etc.

Clearly it is also advantageous that triboluminescent compounds, if they are to be used commercially, are not prohibitively expensive.

There is a continued need for triboluminescent materials for use in such an environment and it is an object of the present invention inter alia to provide alternative compounds suitable for use in a range of applications/devices which are capable of exploiting the triboluminescence effect particularly sensing damage applications.

The current invention provides for, inter alia, the use of a range of compounds in a number of devices/applications which exploit the triboluminescent effect.

According to a first aspect of the present invention materials of formula I are provided:

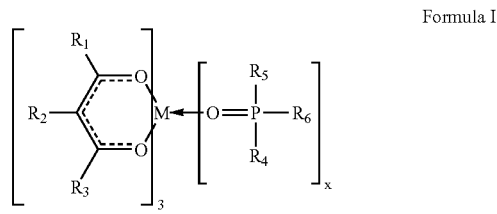

Formula I wherein x is 1 or 2

M is selected from Europium, Terbium, Dysprosium and Samarium;

R1, R2 and R3 are independently of each other selected from phenyl, naphthyl, H and C1-C6 branched or straight chain alkyl, thiophene and C1-C6 fluorinated alkyl wherein the fluorination may be in 1 or all positions or any intermediate value, substituted phenyl wherein the substituents are independently selected from C1-C4 straight or branched chain alkyl, Cl, Br, F, I and the phenyl group may be substituted in 1, 2 or 3 positions;

R4 and R5 are independently of each other selected from phenyl, tolyl, naphthyl, C1-C6 branched or straight chain alkyl and substituted phenyl wherein the substituents are independently selected from C1-C4 straight or branched chain alkyl and the phenyl group may be substituted in 1, 2 or 3 positions;

R6 is selected from phenyl, tolyl, naphthyl, C1-C6 branched or straight chain alkyl, —$(CH_2)_n$P(O)R7 R8, wherein n=1 to 4 and —N=(P R7 R8 R9), wherein R7, R8 and R9 are independently selected from phenyl, naphthyl, C1-C6 branched or straight chain alkyl and substituted phenyl wherein the substituents are independently selected from C1-C4 straight or branched chain alkyl and the phenyl group may be substituted in 1, 2 or 3 positions;

R6 is also selected from substituted phenyl wherein the substituents are independently selected from C1-C4 straight or branched chain alkyl and the phenyl group may be substituted in 1, 2 or 3 positions;

It is understood in the definition of R6 that the phosphine oxide group, [included in —$(CH_2)_n$P(O)R7 R8] if present, may be coordinated to the metal atom M or to another equivalent metal atom as a bridging group.

Preferably

R1, R2 and R3 are independently of each other selected from phenyl, and C1-C4 branched or straight chain alkyl, R4 and R5 are independently of each other selected from phenyl, tolyl and C1-C6 branched or straight chain alkyl, R6 is selected from phenyl, tolyl, C1-C6 branched or straight chain alkyl, and 2-diphenylphosphinooxyethyl.

According to a second aspect of this invention a method of making paper that emits light when torn and/or pressed and/or gripped and/or folded comprises the steps of coating and/or impregnating the paper with triboluminescent material according to the first aspect of the present invention.

When coating and/or impregnating the paper it may be necessary to apply the triboluminescent material in one or more of a number of ways, for example:

- in an adhesive composition, in addition the triboluminescent material may be glued onto the paper either directly and/or in an encapsulant such as a polymer;
- in a solvent followed by solvent evaporation;
- by melting the triboluminescent material such that it soaks into the paper;
- by incorporating the triboluminescent material together with the pulp, fibre etc., during manufacture of the paper.

Preferably the solvent will be an organic solvent though this will be a function of the solvation properties of the triboluminescent material.

Examples of suitable polymers for use in encapsulation include the following:

Acrylic and methacrylic resins, polyimides, polyamides, melamine/formaldehyde resins, urea formaldehyde resins, epoxy resins, poly(p-xylylene), gelatin, poly(lactic acid), polyester resins and alkyd resins.

Typical adhesives include:

Epoxy adhesives based on adducts of bisphenol-A and epichlorhydrin cured by polyamine or anhydride initiators, and similar adhesives based on other epoxides, UV curable and thermally curable adhesives based on acrylic, vinylic, styrenic, or thiol/ene monomer systems, cyanoacrylate adhesives, pressure sensitive adhesives, hot melt adhesives, latex based adhesives, PVA adhesives, solvent based adhesives, urea formaldehyde and melamine formaldehyde adhesives, anaerobic adhesives, bis-diallyamine derived adhesives etc.

In addition to the adhesive and triboluminescent material the adhesive composition may also comprise one or more of the following additional reagents such as solvents, dispersants, plasticisers, curing agents, dyes, fillers, stabilisers, anti-oxidants etc as is understood in the art. The compositions may include water as a solvent or dispersant or an organic solvent such as dichloromethane, acetone, tetrahydrofuran etc. may be present in order to ensure that the composition is homogenous and will spread well.

According to a third aspect of this invention paper is provided which comprises one or more triboluminescent materials according to the first aspect of the present invention such that the paper triboluminesces when the paper is torn and/or pressed and/or gripped and/or folded.

Such paper is obtainable by the method of the second aspect of the invention.

For all of the above aspects of the invention the term paper is also taken to include paper-like products such as cardboard, kitchen-roll, tissue and the like.

According to a fourth aspect of the invention a product comprising the paper of the third aspect of the invention is provided.

According to a fifth aspect of this invention an adhesive composition comprising an adhesive and one or more triboluminescent materials according to the first aspect of the present invention is provided.

According to a sixth aspect of this invention a method of adhering two surfaces together comprises the steps of:

applying an adhesive composition to one or more surfaces and bringing the surfaces into contact such that adhesion occurs wherein the adhesive composition comprises an adhesive and one or more triboluminescent materials according to the first aspect of the present invention.

According to a seventh aspect of this invention a method of making adhesive tape that flashes when used comprises the steps of:

selecting a substantially transparent substrate, optionally depositing an adhesion promoter on the substrate, depositing an adhesive composition comprising a triboluminescent material according to the first aspect of the present invention on to the substrate, optionally drying the adhesive composition, optionally depositing a further laminating sheet on top of the adhesive composition before or after any drying stage.

The laminating sheet, if applied, may be treated with a release layer.

By flashes when used it is meant that the adhesive tape may flash when it is removed from a roll of adhesive tape or it may flash when it is removed from the object to which it has been applied. The adhesive tape may also flash when it is cut. How many times a particular piece of adhesive tape flashes will depend on the nature of the triboluminescent materials used and the adhesive and the substrate to which it has been adhered.

Drying may be carried out using any of the known techniques—these include:

Solvent removal, removal of a dispersant phase, chemical polymerisation or cross linking, chemical reaction or condensation and may be aided by known methods such as application of heat or UV light.

The substrate may comprise triboluminescent material itself, typically this would be carried out during formation of the substrate.

There are various uses to which the adhesive compositions and methods of the present invention may be put. Included are adhesive compositions when used on envelopes and tape and the like for indicating whether or not an envelope or package has been previously opened. Alternatively, seals on containers may comprise adhesive/triboluminesecent compositions according to the present invention so it is evident whether or not a container has been tampered with or damaged such that the seal has been broken in some way. For some of these particular type applications the adhesive and triboluminescent materials may with advantage be selected such that the composition only triboluminesces once.

Hence an eighth aspect of this invention provides a method for detecting tampering of a sealed article comprising the steps of:

coating a part of an unsealed article with an adhesive composition, sealing the article, wherein the adhesive composition further comprises one or more triboluminescent materials according to the first aspect of the present invention such that on breaking the seal triboluminescence will be observed.

The article may be any type of suitable container, for example an envelope or packaging or a bottle and top.

In the above method it is also possible for the adhesive/triboluminescent mixture to be applied once the article has been sealed in some way. An example of this could be a bottle with a screw top wherein the adhesive/triboluminescent mixture could be added once the top has been screwed on to the bottle. The mixture could also be added before and after the sealing.

The present invention also provides for opening packages, envelopes and the like with added aesthetic appeal. It is an objective of the present invention to provide aesthetic effects in relation to adhesives/adhesive tape/paper, paper-like products through the use of technical structures and/or other technical means.

Further aspects of the invention include articles produced by the above methods.

Typical adhesives include:

Epoxy adhesives based on adducts of bisphenol-A and epichlorhydrin cured by polyamine or anhydride initiators, and similar adhesives based on other epoxides, UV curable and thermally curable adhesives based on acrylic, vinylic, styrenic, or thiol/ene monomer systems, cyanoacrylate adhesives, pressure sensitive adhesives, hot melt adhesives, latex based adhesives, PVA adhesives, solvent based adhesives, urea formaldehyde and melamine formaldehyde adhesives, anaerobic adhesives, bis-diallyamine derived adhesives etc.

In addition to the adhesive and triboluminescent material the adhesive composition may also comprise one or more of the following additional components such as solvents, wetting agents, flow modifiers, plasticisers, curing agents, dyes, fillers, stabilisers, anti-oxidants etc as is understood in the art. The compositions may include water as a solvent or dispersant or an organic solvent such as dichloromethane, acetone, tetrahydrofuran etc. may be present in order to ensure that the composition is homogenous and will spread well.

According to a ninth aspect of this invention a damage-sensing device comprises at least one light sensor and at least one triboluminescent material according to the first aspect of the current invention.

The light sensor may be connected directly to the triboluminescent material or via light guiding means such as optical fibres.

The sensor may be embedded within a structure, such as a composite plastics material, or fixed externally to such a structure. Several sensors may be embedded within one structure. Light output from the triboluminescent material may be detected directly, or such light output may be absorbed by photo excitable dye material whose subsequent luminescence is detected. Different triboluminescent material described by the present invention and or different dyes may be used in different parts of a structure so that damage location is readily determined from the wavelength of emission. The detector may be directly connected to each different triboluminescent or dye material, or one or more detectors used with filters or wavelength detection means to determine the location of damage at several sites.

Additionally the damage site may be located by timing receipt of pulses. The intensity of emission may also be measured to give an indication of the severity of impact and hence damage.

The light guiding means may be single or multimode optical fibres, optical transparent sheet or slab within a composite material. The sheet material may have waveguides defined by rib, indiffusion, or etching etc, and may contain secondary emitters.

The detectors may be photo multipliers, photo diodes, as single detectors or in arrays.

Use of the materials of the present invention may be incorporated into the devices described in U.S. Pat. No. 5,905,260 the contents of which are incorporated herein by reference.

The invention will now be described, by way of example only, with reference to the accompanying drawings of which:

Figure 1:
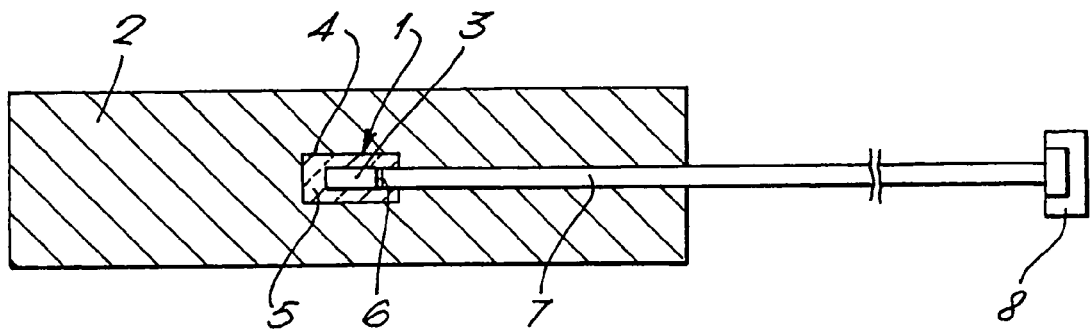
FIG. 1 is a sectional view of a sensor embedded within a structure.

As seen in FIG. 1 a sensor 1 is embedded in a composite material 2 such as a glass or carbon fibre matrix layered material. The sensor 1 comprises a small crystal 3 of a triboluminescent (TL) material as described by the present invention held within a cavity 4 by epoxy resin 5 and optically connected by optical cement such as a UV curing glue 6 from the Norland™ range to an optical fibre 7 which transmits light to an externally mounted detector 8. This detector 8 may be a photo diode or part of an array linked to several crystals.

The composite material 2, may have different triboluminescent materials 3 with their characteristic emissions arranged at different positions within the composite 2. The detectors 8 detect such different wavelengths thereby giving positional information about damage location In operation, e.g. in an aircraft, impact of objects on the composite 2 above a predetermined known energy level will damage the crystal 3 causing it to emit light; high impact energy results in higher light output. The detected light may either be transmitted as a signal directly to the pilot if a serious damage had occurred or stored by computer and read by a maintenance crew at a later stage for damage repair. If the recorded detection indicates composite damage, then that part of the composite may be repaired or replaced before the next aircraft flight.

Thus several different materials constructed as in FIG. 1 may be used as shown in different parts of a structure and a single detector used. In this case the detector must be able to distinguish different wavelengths to indicate which area of the structure has received damage.

Figure 2:
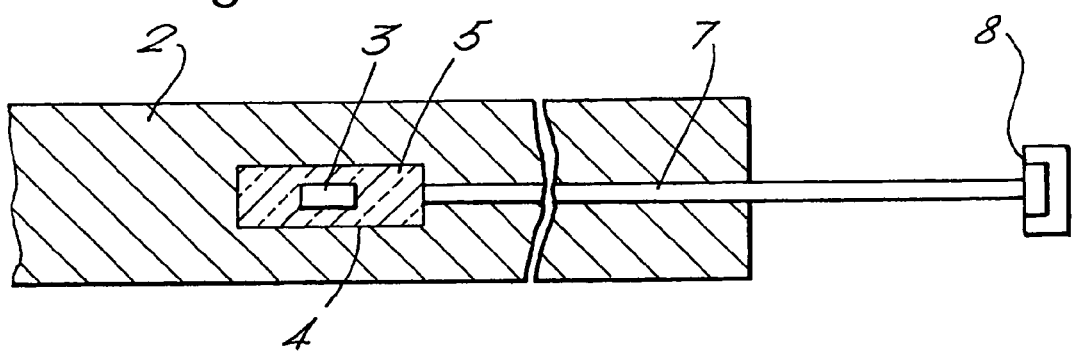
FIG. 2 is similar to and a variation of FIG. 1.

FIG. 2 is similar to FIG. 1 and given like reference numeral. In this example the optical fibre 7 optically connects to glue 5 holding the crystal 3 within the cavity 4. The glue 5 is optically transparent and may be a polymer matrix.

Figure 3:
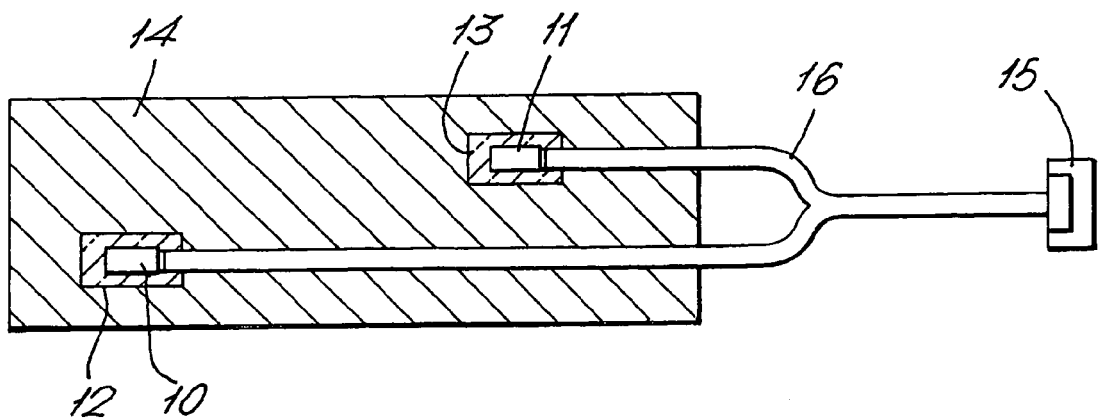
FIG. 3 is a sectional view of two sensors embedded within a structure, with optical fibre readout to a single detector.

FIG. 3 shows different TL crystals 10, 11 (two only shown, but may be many more) located in cavities 12, 13 in different parts of a composite material 14. A single detector 15 connects with each crystal 10, 11 via an optical fibre network 16 and is sensitive to the different emissions of the crystals 10, 11, and can therefore indicate the location of any damage. Such an arrangement reduces the number of cavities needed within the composite material 14.

Figure 4:
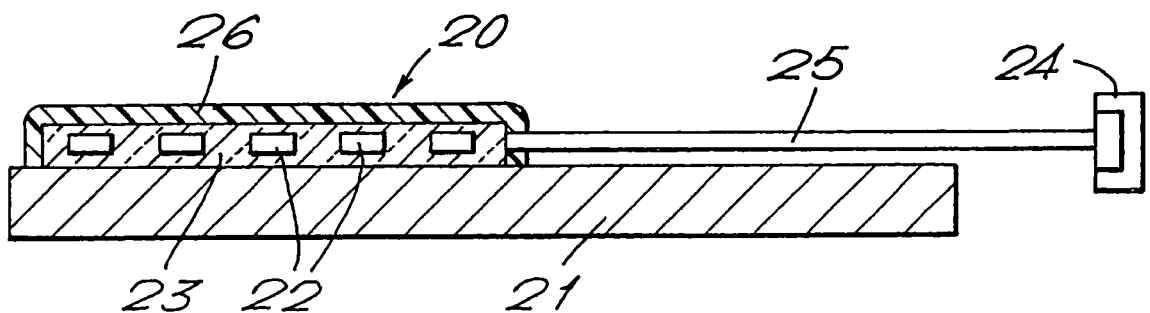
FIG. 4 is a sectional view of a sensor mounted on a surface of a structure.

FIG. 4 shows how a sensor 20 can be mounted externally on a composite material 21. As before one or more TL crystals 22 are encapsulated within an optically transparent glue or resin 23 and coupled to a detector 24 via an optical fibre 25. When a plurality of different crystals 22 are used, the detector 24 is arranged to distinguish between their different emissions wavelengths to give an indication of damage location. A protective layer 26 of opaque material covers the glue 23.

Figure 5:
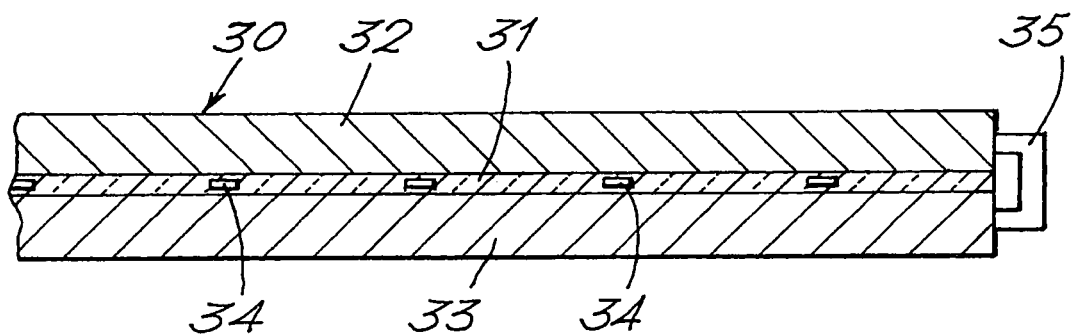
FIG. 5 is a sectional view of several triboluminescent materials and a light guiding layer embedded within a structure.

FIG. 5 shows a composite material 30 in which a layer 31 of a guiding material is sandwiched between two layers 32, 33. Embedded within the light guiding layer 31 are one or more TL crystals 34. A detector 35 is mounted on the edge of the composite material 30. Suitable materials for the light guiding layer 31 include:—UV curing glues, sol-gel, optically transparent polymers, resins or glues.

Figure 6:
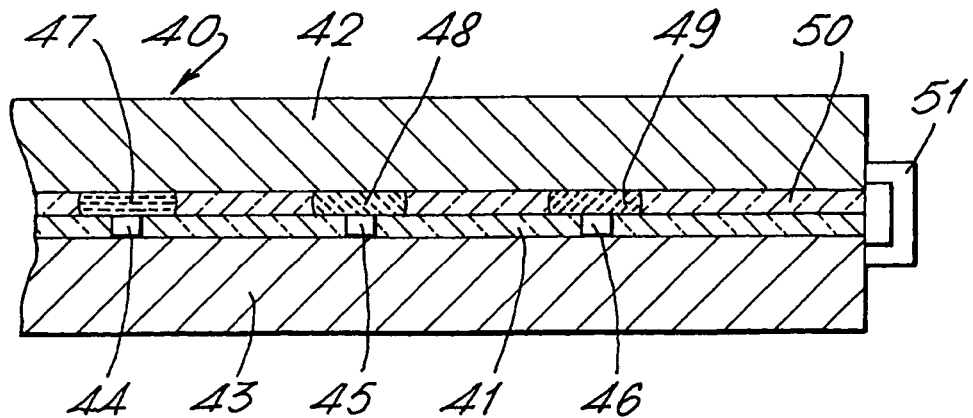
FIG. 6 is similar to that of FIG. 5, but in addition has a different photo excitable dye associated with each triboluminescent material.

FIG. 6 shows a composite material 40 in which a layer 41 of a light guiding material is sandwiched between two layers 42, 43. Embedded within the layer 41 are three TL crystals 44, 45, 46. Above each crystal 44, 45, 46 is a volume of three different photo excitable dyes 47, 48, 49 contained within a second layer 50 of a light guiding material. A detector 51 is sensitive to the outputs of each dye volume 47, 48, 49. When damage occurs, an appropriate crystal 44, 45, 46 will emit light and cause an associated dye volume 47, 48, 49 respectively to emit light at a characteristic wavelength which is guided by the layer 50 to the detector 51.

Figure 7:
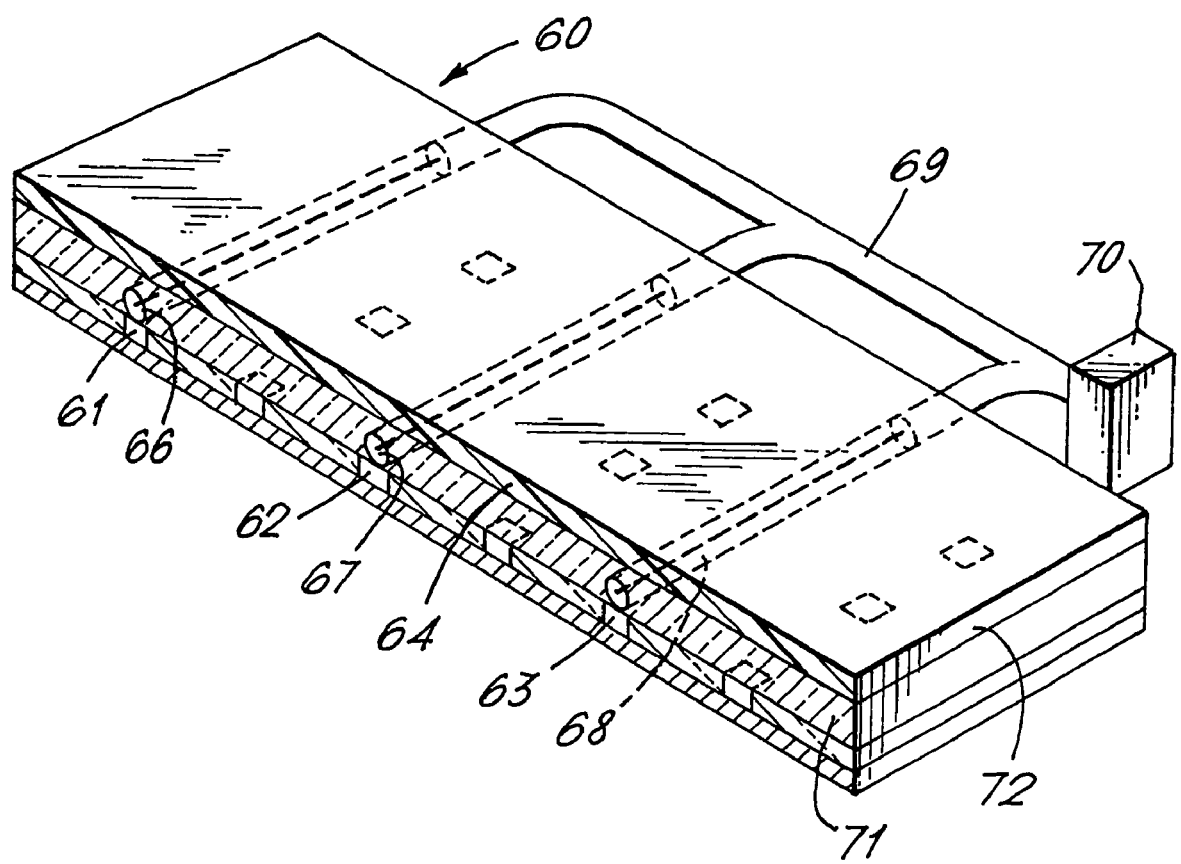
FIG. 7 is a perspective view of a sensor employing three differently doped fibres each directing light from several triboluminescent materials to a single detector.

FIG. 7 shows a composite layer material 60 in which several TL crystals 61, 62, 63 are embedded in rows within a layer 64. Optical fibres 66, 67, 68 containing photo excitable dyes are in optical contact with these rows of crystals 61, 62, 63 and connect via an optical fibre network 69 to one or more detectors 70. The fibres 66, 67, 68 are embedded in an optically transparent layer 71 and covered with a protective layer 72 of composite fibre. The crystals 61, 62, 63 may be one of the adducts of the present invention, the fibres 66, 67, 68 maybe glass single or multi mode fibres, or polymer fibres; the glues may be RS™ bipax epoxy, Araldite™ fast setting, or Norland UV curing flues.

In a modification of FIG. 7 an additional set of differently doped optical fibres is arranged in columns so that an x,y matrix of differently doped optical fibres lies within a composite material. The column fibres are connected to one or more detectors as in FIG. 7. Signals from these two detectors indicate where in the matrix, light is being received.

A flashing form of paper, (e.g. writing paper, tissue or cardboard) according to the present invention may be fabricated as follows. Paper is soaked in a solution of triboluminescent material and any excess solvent is evaporated off. The paper may then be torn, folded or crumpled to test for a triboluminescent effect.

An alternative method of fabrication involves melting the triboluminescent material and allowing the melt to soak into the paper.

An alternative method of fabrication involves gluing triboluminescent material to the surface of the paper, alternatively the triboluminescent material is encapsulated, for example, in polymer which may then be coated on to the surface of the paper. Examples of suitable polymer include poly vinyl alcohol. The polymer may be applied whilst still in monomer form and subsequently cured.

A flashing form of adhesive tape according to the present invention may be fabricated as follows. An adhesive compound which may be cured via any of the known methods of curing including by uv polymerisation and a triboluminescent material are placed on to a sheet of plastic material. A further sheet of plastic is pressed on top of the first sheet, sandwiching the adhesive/triboluminescent mixture. The sheets plus mixture are then subject to curing such that the monomer polymerises—it may be the case that an amount of the monomer remains unpolymerised. In order to assess the tape the sheets may be pulled apart to reveal bright flashes.

It is not necessarily the case that the adhesive is a monomer system—any type of adhesive known to those skilled in the art would be suitable. The mixture need not necessarily require curing.

Example triboluminescenrt complexes according to the invention were prepared by the methods described below. In assessing the relative brightnesses of triboluminescent materials, it is understood by those skilled in the art that quantitative comparisons are made difficult by the dependancy of the triboluminescent emission intensity on such factors as the crystalline particle size and crystal habit of the sample, the force applied to the sample, traces of different impurities which may occur in the sample, the geometry of the optical detector and its wavelength sensitivity. For the purpose of evaluating the usefulness of the compounds of the invention, a semi-quantitative scale was employed based on observation of the triboluminescent emission from the samples by eye, while the materials in the form of crystalline powders were crushed in a soda lime glass sample tube under hand pressure with a stainless steel spatula. The brightness is then assessed according to the highest level of ambient illumination, in the presence of which the triboluminescent emission becomes visible. The scale employed is:

| Brightness Scale | Maximum ambient light for observation |
| --- | --- |
| 10 | Full daylight |
| 9 | Diffuse daylight |
| 8 | Bright room lighting |
| 7 | Subdued room lighting |
| 6 | Dim artificial light |
| 5 | Semi-darkness |
| 4 | Darkness, without dark adaptation of the eye |
| 3 | Darkness, with up to 2 mins dark adaptation |
| 2 | Darkness, with up to 10 mins dark adaptation |
| 1 | Visible with fully dark adapted eye |
| 0 | No observable triboluminescence |

Compounds of this invention may be prepared by means which are apparent to those skilled in the art. Known metal tris β-diketonates may be reacted with one or two molar quantities of substituted phosphine oxides. Phosphine oxides are known materials which are in many cases commercially available. In cases where the phosphine oxide is not a commercial product, but the phosphine is available, the phosphine may be oxidised to the phosphine oxide, for example by treatment with an excess of hydrogen peroxide in ethanol. An alternative synthesis comprises the combination of the β-diketone, the phosphine oxide and a salt of the metal in appropriate molar ratios with a small excess of a base. A suitable base includes potassium ethoxide, when the reaction is conveniently carried out in solution in ethanol. Preferably the reagents and solvents used in the synthesis, irrespective of the route chosen, are substantially anhydrous. Purification of the products may be carried out by recrystallisation from a solvent eg., from anhydrous ethanol or dry toluene.

EXAMPLE SYNTHESIS

Tris 2,2,6,6-tetramethylheptanedionato terbium triphenylphosphine oxide adduct

Terbium tris 2,2,6,6-tetramethylheptanedionate (1 g) and triphenylphosphine oxide (0.393 g) were added to anhydrous ethanol (3 ml). The mixture was warmed to dissolve the solid, and then raised to boiling for 10 minutes. The solution was cooled to room temperature and then to 0° C. to induce crystallisation of the product. The off-white solid was filtered off and recrystallised from anhydrous ethanol and dried in vacuo at 60° C. to yield tris 2,2,6,6-tetramethylheptanedionato terbium triphenylphosphine oxide adduct (0.9 g) as a white solid.

The following compounds were synthesised in the same way:

Tris acetylacetonato terbium triphenylphosphine oxide adduct
Tris acetylacetonato terbium tritolylphosphine oxide adduct
Tris acetylacetonato terbium 1-naphthyldiphenylphosphine oxide adduct
Tris acetylacetonato terbium bisdiphenylphosphinoethane bis P-oxide adduct
Tris acetylacetonato terbium bisdiphenylphosphinopropane bis P-oxide adduct
Tris acetylacetonato terbium bisdiphenylphosphinobutane bis P-oxide adduct
Tris acetylacetonato terbium diphenyl(triphenylphosphinaza)phosphine oxide adduct
Tris dibenzoylmethanato terbium triphenylphosphine oxide adduct
Tris dibenzoylmethanato terbium tritolylphosphine oxide adduct
Tris dibenzoylmethanato terbium 1-naphthyidiphenylphosphine oxide adduct
Tris dibenzoylmethanato terbium bisdiphenylphosphinoethane bis P-oxide adduct
Tris dibenzoylmethanato terbium bisdiphenylphosphinopropane bis P-oxide adduct
Tris dibenzoylmethanato terbium bisdiphenylphosphinobutane bis P-oxide adduct
Tris dibenzoylmethanato terbium diphenyl(triphenylphosphinaza)phosphine oxide adduct
Tris thenoyltrifluoroacetonato terbium triphenylphosphine oxide adduct
Tris thenoyltrifluoroacetonato terbium tritolylphosphine oxide adduct
Tris thenoyltrifluoroacetonato terbium 1-naphthyldiphenylphosphine oxide adduct
Tris thenoyltrifluoroacetonato terbium bisdiphenylphosphinoethane bis P-oxide adduct
Tris thenoyltrifluoroacetonato terbium bisdiphenylphosphinopropane bis P-oxide adduct
Tris thenoyltrifluoroacetonato terbium bisdiphenylphosphinobutane bis P-oxide adduct
Tris thenoyltrifluoroacetonato terbium diphenyl(triphenylphosphinaza)phosphine oxide adduct
Tris 2,2,6,6-tetramethylheptanedionato terbium triphenylphosphine oxide adduct brightness=4
Tris 2,2,6,6-tetramethylheptanedionato terbium tritolylphosphine oxide adduct
Tris 2,2,6,6-tetramethylheptanedionato terbium 1-naphthyidiphenylphosphine oxide adduct
Tris 2,2,6,6-tetramethylheptanedionato terbium bisdiphenylphosphinoethane bis P-oxide adduct
Tris 2,2,6,6-tetramethylheptanedionato terbium bisdiphenylphosphinopropane bis P-oxide adduct
Tris 2,2,6,6-tetramethylheptanedionato terbium bisdiphenylphosphinobutane bis P-oxide adduct
Tris 2,2,6,6-tetramethylheptanedionato terbium diphenyl(triphenylphosphinaza)phosphine oxide adduct
Tris 3-methylpentane-2,4-dionato terbium triphenylphosphine oxide adduct
Tris 3-methylpentane-2,4-dionato terbium tritolylphosphine oxide adduct
Tris 3-methylpentane-2,4-dionato terbium 1-naphthyldiphenylphosphine oxide adduct
Tris 3-methylpentane-2,4-dionato terbium bisdiphenylphosphinoethane bis P-oxide adduct
Tris 3-methylpentane-2,4-dionato terbium bisdiphenylphosphinopropane bis P-oxide adduct
Tris 3-methylpentane-2,4-dionato terbium bisdiphenylphosphinobutane bis P-oxide adduct
Tris 3-methylpentane-2,4-dionato terbium diphenyl(triphenylphosphinaza)phosphine oxide adduct
Tris 3-ethylpentane-2,4-dionato terbium triphenylphosphine oxide adduct
Tris 3-ethylpentane-2,4-dionato terbium tritolylphosphine oxide adduct
Tris 3-ethylpentane-2,4-dionato terbium 1-naphthyldiphenylphosphine oxide adduct
Tris 3-ethylpentane-2,4-dionato terbium bisdiphenylphosphinoethane bis P-oxide adduct
Tris 3-ethylpentane-2,4-dionato terbium bisdiphenylphosphinopropane bis P-oxide adduct
Tris 3-ethylpentane-2,4-dionato terbium bisdiphenylphosphinobutane bis P-oxide adduct
Tris 3-ethylpentane-2,4-dionato terbium diphenyl(triphenylphosphinaza)phosphine oxide adduct
Tris pivaloyltrifluoroacetonato terbium triphenylphosphine oxide adduct
Tris pivaloyltrifluoroacetonato terbium tritolylphosphine oxide adduct
Tris pivaloyltrifluoroacetonato terbium 1-naphthyldiphenylphosphine oxide adduct
Tris pivaloyltrifluoroacetonato terbium bisdiphenylphosphinoethane bis P-oxide adduct
Tris pivaloyltrifluoroacetonato terbium bisdiphenylphosphinopropane bis P-oxide adduct
Tris pivaloyltrifluoroacetonato terbium bisdiphenylphosphinobutane bis P-oxide adduct
Tris pivaloyltrifluoroacetonato terbium diphenyl(triphenylphosphinaza)phosphine oxide adduct
Tris trifluoroacetylacetonato terbium triphenylphosphine oxide adduct
Tris trifluoroacetylacetonato terbium tritolylphosphine oxide adduct
Tris trifluoroacetylacetonato terbium 1-naphthyldiphenylphosphine oxide adduct
Tris trifluoroacetylacetonato terbium bisdiphenylphosphinoethane bis P-oxide adduct
Tris trifluoroacetylacetonato terbium bisdiphenylphosphinopropane bis P-oxide adduct
Tris trifluoroacetylacetonato terbium bisdiphenylphosphinobutane bis P-oxide adduct
Tris trifluoroacetylacetonato terbium diphenyl(triphenylphosphinaza)phosphine oxide adduct
Tris hexafluoroacetylacetonato terbium triphenylphosphine oxide adduct
Tris hexafluoroacetylacetonato terbium tritolylphosphine oxide adduct
Tris hexafluoroacetylacetonato terbium 1-naphthyldiphenylphosphine oxide adduct
Tris hexafluoroacetylacetonato terbium bisdiphenylphosphinoethane bis P-oxide adduct
Tris hexafluoroacetylacetonato terbium bisdiphenylphosphinopropane bis P-oxide adduct
Tris hexafluoroacetylacetonato terbium bisdiphenylphosphinobutane bis P-oxide adduct Tris hexafluoroacetylacetonato terbium diphenyl(triphenylphosphinaza)phosphine oxide adduct Tris 6,6,7,7,8,8,8-heptafluoro-2,2-dimethyloctanedionato terbium triphenylphosphine oxide adduct Tris 6,6,7,7,8,8,8-heptafluoro-2,2-dimethyloctanedionato terbium tritolylphosphine oxide adduct Tris 6,6,7,7,8,8,8-heptafluoro-2,2-dimethyloctanedionato terbium 1-naphthyidiphenylphosphine oxide adduct Tris 6,6,7,7,8,8,8-heptafluoro-2,2-dimethyloctanedionato terbium bisdiphenylphosphinoethane bis P-oxide adduct Tris 6,6,7,7,8,8,8-heptafluoro-2,2-dimethyloctanedionato terbium bisdiphenylphosphinopropane bis P-oxide adduct Tris 6,6,7,7,8,8,8-heptafluoro-2,2-dimethyloctanedionato terbium bisdiphenylphosphinobutane bis P-oxide adduct Tris 6,6,7,7,8,8,8-heptafluoro-2,2-dimethyloctanedionato terbium diphenyl(triphenylphosphinaza)phosphine oxide adduct Tris 1-phenyl-1,3-butanedionato terbium triphenylphosphine oxide adduct Tris 1-phenyl-1,3-butanedionato terbium tritolylphosphine oxide adduct Tris 1-phenyl-1,3-butanedionato terbium 1-naphthyldiphenylphosphine oxide adduct Tris 1-phenyl-1,3-butanedionato terbium bisdiphenylphosphinoethane bis P-oxide adduct Tris 1-phenyl-1,3-butanedionato terbium bisdiphenylphosphinopropane bis P-oxide adduct Tris 1-phenyl-1,3-butanedionato terbium bisdiphenylphosphinobutane bis P-oxide adduct Tris 1-phenyl-1,3-butanedionato terbium diphenyl(triphenylphosphinaza)phosphine oxide adduct Tris acetylacetonato europium triphenylphosphine oxide adduct Tris acetylacetonato europium tritolylphosphine oxide adduct Tris acetylacetonato europium 1-naphthyldiphenylphosphine oxide adduct Tris acetylacetonato europium bisdiphenylphosphinoethane bis P-oxide adduct Tris acetylacetonato europium bisdiphenylphosphinopropane bis P-oxide adduct Tris acetylacetonato europium bisdiphenylphosphinobutane bis P-oxide adduct Tris acetylacetonato europium diphenyl(triphenylphosphinaza)phosphine oxide adduct Tris dibenzoylmethanato europium triphenylphosphine oxide adduct Tris dibenzoylmethanato europium tritolylphosphine oxide adduct Tris dibenzoylmethanato europium 1-naphthyldiphenylphosphine oxide adduct Tris dibenzoylmethanato europium bisdiphenylphosphinoethane bis P-oxide adduct Tris dibenzoylmethanato europium bisdiphenylphosphinopropane bis P-oxide adduct Tris dibenzoylmethanato europium bisdiphenylphosphinobutane bis P-oxide adduct Tris dibenzoylmethanato europium diphenyl(triphenylphosphinaza)phosphine oxide adduct Tris thenoyltrifluoroacetonato europium triphenylphosphine oxide adduct Tris thenoyltrifluoroacetonato europium tritolylphosphine oxide adduct Tris thenoyltrifluoroacetonato europium 1-naphthyldiphenylphosphine oxide adduct Tris thenoyltrifluoroacetonato europium bisdiphenylphosphinoethane bis P-oxide adduct Tris thenoyltrifluoroacetonato europium bisdiphenylphosphinopropane bis P-oxide adduct Tris thenoyltrifluoroacetonato europium bisdiphenylphosphinobutane bis P-oxide adduct Tris thenoyltrifluoroacetonato europium diphenyl(triphenylphosphinaza)phosphine oxide adduct Tris 2,2,6,6-tetramethylheptanedionato europium triphenylphosphine oxide adduct brightness=3

Tris 2,2,6,6-tetramethylheptanedionato europium tritolylphosphine oxide adduct

Tris 2,2,6,6-tetramethylheptanedionato europium 1-naphthyldiphenylphosphine oxide adduct Tris 2,2,6,6-tetramethylheptanedionato europium bisdiphenylphosphinoethane bis P-oxide adduct Tris 2,2,6,6-tetramethylheptanedionato europium bisdiphenylphosphinopropane bis P-oxide adduct Tris 2,2,6,6-tetramethylheptanedionato europium bisdiphenylphosphinobutane bis P-oxide adduct Tris 2,2,6,6-tetramethylheptanedionato europium diphenyl(triphenylphosphinaza)phosphine oxide adduct Tris 3-methylpentane-2,4-dionato europium triphenylphosphine oxide adduct Tris 3-methylpentane-2,4-dionato europium tritolylphosphine oxide adduct Tris 3-methylpentane-2,4-dionato europium 1-naphthyldiphenylphosphine oxide adduct Tris 3-methylpentane-2,4-dionato europium bisdiphenylphosphinoethane bis P-oxide adduct Tris 3-methylpentane-2,4-dionato europium bisdiphenylphosphinopropane bis P-oxide adduct Tris 3-methylpentane-2,4-dionato europium bisdiphenylphosphinobutane bis P-oxide adduct Tris 3-methylpentane-2,4-dionato europium diphenyl(triphenylphosphinaza)phosphine oxide adduct Tris 3-ethylpentane-2,4-dionato europium triphenylphosphine oxide adduct Tris 3-ethylpentane-2,4-dionato europium tritolylphosphine oxide adduct Tris 3-ethylpentane-2,4-dionato europium 1-naphthyidiphenylphosphine oxide adduct Tris 3-ethylpentane-2,4-dionato europium bisdiphenylphosphinoethane bis P-oxide adduct Tris 3-ethylpentane-2,4-dionato europium bisdiphenylphosphinopropane bis P-oxide adduct Tris 3-ethylpentane-2,4-dionato europium bisdiphenylphosphinobutane bis P-oxide adduct Tris 3-ethylpentane-2,4-dionato europium diphenyl(triphenylphosphinaza)phosphine oxide adduct Tris pivaloyltrifluoroacetonato europium triphenylphosphine oxide adduct Tris pivaloyltrifluoroacetonato europium tritolylphosphine oxide adduct Tris pivaloyltrifluoroacetonato europium 1-naphthyldiphenylphosphine oxide adduct Tris pivaloyltrifluoroacetonato europium bisdiphenylphosphinoethane bis P-oxide adduct Tris pivaloyltrifluoroacetonato europium bisdiphenylphosphinopropane bis P-oxide adduct Tris pivaloyltrifluoroacetonato europium bisdiphenylphosphinobutane bis P-oxide adduct Tris pivaloyltrifluoroacetonato europium diphenyl(triphenylphosphinaza)phosphine oxide adduct Tris trifluoroacetylacetonato europium triphenylphosphine oxide adduct Tris trifluoroacetylacetonato europium tritolylphosphine oxide adduct Tris trifluoroacetylacetonato europium 1-naphthyldiphenylphosphine oxide adduct
Tris trifluoroacetylacetonato europium bisdiphenylphosphinoethane bis P-oxide adduct
Tris trifluoroacetylacetonato europium bisdiphenylphosphinopropane bis P-oxide adduct
Tris trifluoroacetylacetonato europium bisdiphenylphosphinobutane bis P-oxide adduct
Tris trifluoroacetylacetonato europium diphenyl(triphenylphosphinaza)phosphine oxide adduct
Tris hexafluoroacetylacetonato europium triphenylphosphine oxide adduct
Tris hexafluoroacetylacetonato europium tritolylphosphine oxide adduct
Tris hexafluoroacetylacetonato europium 1-naphthyldiphenylphosphine oxide adduct
Tris hexafluoroacetylacetonato europium bisdiphenylphosphinoethane bis P-oxide adduct
Tris hexafluoroacetylacetonato europium bisdiphenylphosphinopropane bis P-oxide adduct
Tris hexafluoroacetylacetonato europium bisdiphenylphosphinobutane bis P-oxide adduct
Tris hexafluoroacetylacetonato europium diphenyl(triphenylphosphinaza)phosphine oxide adduct
Tris 6,6,7,7,8,8,8-heptafluoro-2,2-dimethyloctanedionato europium triphenylphosphine oxide adduct
Tris 6,6,7,7,8,8,8-heptafluoro-2,2-dimethyloctanedionato europium tritolylphosphine oxide adduct
Tris 6,6,7,7,8,8,8-heptafluoro-2,2-dimethyloctanedionato europium 1-naphthyidiphenylphosphine oxide adduct
Tris 6,6,7,7,8,8,8-heptafluoro-2,2-dimethyloctanedionato europium bisdiphenylphosphinoethane bis P-oxide adduct
Tris 6,6,7,7,8,8,8-heptafluoro-2,2-dimethyloctanedionato europium bisdiphenylphosphinopropane bis P-oxide adduct
Tris 6,6,7,7,8,8,8-heptafluoro-2,2-dimethyloctanedionato europium bisdiphenylphosphinobutane bis P-oxide adduct
Tris 6,6,7,7,8,8,8-heptafluoro-2,2-dimethyloctanedionato europium diphenyl(triphenylphosphinaza)phosphine oxide adduct
Tris 1-phenyl-1,3-butanedionato europium triphenylphosphine oxide adduct
Tris 1-phenyl-1,3-butanedionato europium tritolylphosphine oxide adduct
Tris 1-phenyl-1,3-butanedionato europium 1-naphthyldiphenylphosphine oxide adduct
Tris 1-phenyl-1,3-butanedionato europium bisdiphenylphosphinoethane bis P-oxide adduct
Tris 1-phenyl-1,3-butanedionato europium bisdiphenylphosphinopropane bis P-oxide adduct
Tris 1-phenyl-1,3-butanedionato europium bisdiphenylphosphinobutane bis P-oxide adduct
Tris 1-phenyl-1,3-butanedionato europium diphenyl(triphenylphosphinaza)phosphine oxide adduct
Tris acetylacetonato samarium triphenylphosphine oxide adduct
Tris acetylacetonato samarium tritolylphosphine oxide adduct
Tris acetylacetonato samarium 1-naphthyidiphenylphosphine oxide adduct
Tris acetylacetonato samarium bisdiphenylphosphinoethane bis P-oxide adduct
Tris acetylacetonato samarium bisdiphenylphosphinopropane bis P-oxide adduct
Tris acetylacetonato samarium bisdiphenylphosphinobutane bis P-oxide adduct
Tris acetylacetonato samarium diphenyl(triphenylphosphinaza)phosphine oxide adduct
Tris dibenzoylmethanato samarium triphenylphosphine oxide adduct
Tris dibenzoylmethanato samarium tritolylphosphine oxide adduct
Tris dibenzoylmethanato samarium 1-naphthyldiphenylphosphine oxide adduct
Tris dibenzoylmethanato samarium bisdiphenylphosphinoethane bis P-oxide adduct
Tris dibenzoylmethanato samarium bisdiphenylphosphinopropane bis P-oxide adduct
Tris dibenzoylmethanato samarium bisdiphenylphosphinobutane bis P-oxide adduct
Tris dibenzoylmethanato samarium diphenyl(triphenylphosphinaza)phosphine oxide adduct
Tris thenoyltrifluoroacetonato samarium triphenylphosphine oxide adduct
Tris thenoyltrifluoroacetonato samarium tritolylphosphine oxide adduct
Tris thenoyltrifluoroacetonato samarium 1-naphthyldiphenylphosphine oxide adduct
Tris thenoyltrifluoroacetonato samarium bisdiphenylphosphinoethane bis P-oxide adduct
Tris thenoyltrifluoroacetonato samarium bisdiphenylphosphinopropane bis P-oxide adduct
Tris thenoyltrifluoroacetonato samarium bisdiphenylphosphinobutane bis P-oxide adduct
Tris thenoyltrifluoroacetonato samarium diphenyl(triphenylphosphinaza)phosphine oxide adduct
Tris 2,2,6,6-tetramethylheptanedionato samarium triphenylphosphine oxide adduct brightness=1
Tris 2,2,6,6-tetramethylheptanedionato samarium tritolylphosphine oxide adduct
Tris 2,2,6,6-tetramethylheptanedionato samarium 1-naphthyldiphenylphosphine oxide adduct
Tris 2,2,6,6-tetramethylheptanedionato samarium bisdiphenylphosphinoethane bis P-oxide adduct
Tris 2,2,6,6-tetramethylheptanedionato samarium bisdiphenylphosphinopropane bis P-oxide adduct
Tris 2,2,6,6-tetramethylheptanedionato samarium bisdiphenylphosphinobutane bis P-oxide adduct
Tris 2,2,6,6-tetramethylheptanedionato samarium diphenyl(triphenylphosphinaza)phosphine oxide adduct
Tris 3-methylpentane-2,4-dionato samarium triphenylphosphine oxide adduct
Tris 3-methylpentane-2,4-dionato samarium tritolylphosphine oxide adduct
Tris 3-methylpentane-2,4-dionato samarium 1-naphthyldiphenylphosphine oxide adduct
Tris 3-methylpentane-2,4-dionato samarium bisdiphenylphosphinoethane bis P-oxide adduct
Tris 3-methylpentane-2,4-dionato samarium bisdiphenylphosphinopropane bis P-oxide adduct
Tris 3-methylpentane-2,4-dionato samarium bisdiphenylphosphinobutane bis P-oxide adduct
Tris 3-methylpentane-2,4-dionato samarium diphenyl(triphenylphosphinaza)phosphine oxide adduct
Tris 3-ethylpentane-2,4-dionato samarium triphenylphosphine oxide adduct
Tris 3-ethylpentane-2,4-dionato samarium tritolylphosphine oxide adduct
Tris 3-ethylpentane-2,4-dionato samarium 1-naphthyidiphenylphosphine oxide adduct Tris 3-ethylpentane-2,4-dionato samarium bisdiphenylphosphinoethane bis P-oxide adduct
Tris 3-ethylpentane-2,4-dionato samarium bisdiphenylphosphinopropane bis P-oxide adduct
Tris 3-ethylpentane-2,4-dionato samarium bisdiphenylphosphinobutane bis P-oxide adduct
Tris 3-ethylpentane-2,4-dionato samarium diphenyl(triphenylphosphinaza)phosphine oxide adduct
Tris pivaloyltrifluoroacetonato samarium triphenylphosphine oxide adduct
Tris pivaloyltrifluoroacetonato samarium tritolylphosphine oxide adduct
Tris pivaloyltrifluoroacetonato samarium 1-naphthyldiphenylphosphine oxide adduct
Tris pivaloyltrifluoroacetonato samarium bisdiphenylphosphinoethane bis P-oxide adduct
Tris pivaloyltrifluoroacetonato samarium bisdiphenylphosphinopropane bis P-oxide adduct
Tris pivaloyltrifluoroacetonato samarium bisdiphenylphosphinobutane bis P-oxide adduct
Tris pivaloyltrifluoroacetonato samarium diphenyl(triphenylphosphinaza)phosphine oxide adduct
Tris trifluoroacetylacetonato samarium triphenylphosphine oxide adduct
Tris trifluoroacetylacetonato samarium tritolylphosphine oxide adduct
Tris trifluoroacetylacetonato samarium 1-naphthyldiphenylphosphine oxide adduct
Tris trifluoroacetylacetonato samarium bisdiphenylphosphinoethane bis P-oxide adduct
Tris trifluoroacetylacetonato samarium bisdiphenylphosphinopropane bis P-oxide adduct
Tris trifluoroacetylacetonato samarium bisdiphenylphosphinobutane bis P-oxide adduct
Tris trifluoroacetylacetonato samarium diphenyl(triphenylphosphinaza)phosphine oxide adduct
Tris hexafluoroacetylacetonato samarium triphenylphosphine oxide adduct
Tris hexafluoroacetylacetonato samarium tritolylphosphine oxide adduct
Tris hexafluoroacetylacetonato samarium 1-naphthyldiphenylphosphine oxide adduct
Tris hexafluoroacetylacetonato samarium bisdiphenylphosphinoethane bis P-oxide adduct
Tris hexafluoroacetylacetonato samarium bisdiphenylphosphinopropane bis P-oxide adduct
Tris hexafluoroacetylacetonato samarium bisdiphenylphosphinobutane bis P-oxide adduct
Tris hexafluoroacetylacetonato samarium diphenyl(triphenylphosphinaza)phosphine oxide adduct
Tris 6,6,7,7,8,8,8-heptafluoro-2,2-dimethyloctanedionato samarium triphenylphosphine oxide adduct
Tris 6,6,7,7,8,8,8-heptafluoro-2,2-dimethyloctanedionato samarium tritolylphosphine oxide adduct
Tris 6,6,7,7,8,8,8-heptafluoro-2,2-dimethyloctanedionato samarium 1-naphthyldiphenylphosphine oxide adduct
Tris 6,6,7,7,8,8,8-heptafluoro-2,2-dimethyloctanedionato samarium bisdiphenylphosphinoethane bis P-oxide adduct
Tris 6,6,7,7,8,8,8-heptafluoro-2,2-dimethyloctanedionato samarium bisdiphenylphosphinopropane bis P-oxide adduct
Tris 6,6,7,7,8,8,8-heptafluoro-2,2-dimethyloctanedionato samarium bisdiphenylphosphinobutane bis P-oxide adduct
Tris 6,6,7,7,8,8,8-heptafluoro-2,2-dimethyloctanedionato samarium diphenyl(triphenylphosphinaza)phosphine oxide adduct
Tris 1-phenyl-1,3-butanedionato samarium triphenylphosphine oxide adduct
Tris 1-phenyl-1,3-butanedionato samarium tritolylphosphine oxide adduct
Tris 1-phenyl-1,3-butanedionato samarium 1-naphthyidiphenylphosphine oxide adduct
Tris 1-phenyl-1,3-butanedionato samarium bisdiphenylphosphinoethane bis P-oxide adduct
Tris 1-phenyl-1,3-butanedionato samarium bisdiphenylphosphinopropane bis P-oxide adduct
Tris 1-phenyl-1,3-butanedionato samarium bisdiphenylphosphinobutane bis P-oxide adduct
Tris 1-phenyl-1,3-butanedionato samarium diphenyl(triphenylphosphinaza)phosphine oxide adduct
Tris acetylacetonato dysprosium triphenylphosphine oxide adduct
Tris acetylacetonato dysprosium tritolylphosphine oxide adduct
Tris acetylacetonato dysprosium 1-naphthyldiphenylphosphine oxide adduct
Tris acetylacetonato dysprosium bisdiphenylphosphinoethane bis P-oxide adduct
Tris acetylacetonato dysprosium bisdiphenylphosphinopropane bis P-oxide adduct
Tris acetylacetonato dysprosium bisdiphenylphosphinobutane bis P-oxide adduct
Tris acetylacetonato dysprosium diphenyl(triphenylphosphinaza)phosphine oxide adduct
Tris dibenzoylmethanato dysprosium triphenylphosphine oxide adduct
Tris dibenzoylmethanato dysprosium tritolylphosphine oxide adduct
Tris dibenzoylmethanato dysprosium 1-naphthyidiphenylphosphine oxide adduct
Tris dibenzoylmethanato dysprosium bisdiphenylphosphinoethane bis P-oxide adduct
Tris dibenzoylmethanato dysprosium bisdiphenylphosphinopropane bis P-oxide adduct
Tris dibenzoylmethanato dysprosium bisdiphenylphosphinobutane bis P-oxide adduct
Tris dibenzoylmethanato dysprosium diphenyl(triphenylphosphinaza)phosphine oxide adduct
Tris thenoyltrifluoroacetonato dysprosium triphenylphosphine oxide adduct
Tris thenoyltrifluoroacetonato dysprosium tritolylphosphine oxide adduct
Tris thenoyltrifluoroacetonato dysprosium 1-naphthyldiphenylphosphine oxide adduct
Tris thenoyltrifluoroacetonato dysprosium bisdiphenylphosphinoethane bis P-oxide adduct
Tris thenoyltrifluoroacetonato dysprosium bisdiphenylphosphinopropane bis P-oxide adduct
Tris thenoyltrifluoroacetonato dysprosium bisdiphenylphosphinobutane bis P-oxide adduct
Tris thenoyltrifluoroacetonato dysprosium diphenyl(triphenylphosphinaza)phosphine oxide adduct
Tris 2,2,6,6-tetramethylheptanedionato dysprosium triphenylphosphine oxide adduct brightness=4
Tris 2,2,6,6-tetramethylheptanedionato dysprosium tritolylphosphine oxide adduct
Tris 2,2,6,6-tetramethylheptanedionato dysprosium 1-naphthyldiphenylphosphine oxide adduct
Tris 2,2,6,6-tetramethylheptanedionato dysprosium bisdiphenylphosphinoethane bis P-oxide adduct Tris 2,2,6,6-tetramethylheptanedionato dysprosium bisdiphenylphosphinopropane bis P-oxide adduct
Tris 2,2,6,6-tetramethylheptanedionato dysprosium bisdiphenylphosphinobutane bis P-oxide adduct
Tris 2,2,6,6-tetramethylheptanedionato dysprosium diphenyl(triphenylphosphinaza)phosphine oxide adduct
Tris 3-methylpentane-2,4-dionato dysprosium triphenylphosphine oxide adduct
Tris 3-methylpentane-2,4-dionato dysprosium tritolylphosphine oxide adduct
Tris 3-methylpentane-2,4-dionato dysprosium 1-naphthyldiphenylphosphine oxide adduct
Tris 3-methylpentane-2,4-dionato dysprosium bisdiphenylphosphinoethane bis P-oxide adduct
Tris 3-methylpentane-2,4-dionato dysprosium bisdiphenylphosphinopropane bis P-oxide adduct
Tris 3-methylpentane-2,4-dionato dysprosium bisdiphenylphosphinobutane bis P-oxide adduct
Tris 3-methylpentane-2,4-dionato dysprosium diphenyl(triphenylphosphinaza)phosphine oxide adduct
Tris 3-ethylpentane-2,4-dionato dysprosium triphenylphosphine oxide adduct
Tris 3-ethylpentane-2,4-dionato dysprosium tritolylphosphine oxide adduct
Tris 3-ethylpentane-2,4-dionato dysprosium 1-naphthyldiphenylphosphine oxide adduct
Tris 3-ethylpentane-2,4-dionato dysprosium bisdiphenylphosphinoethane bis P-oxide adduct
Tris 3-ethylpentane-2,4-dionato dysprosium bisdiphenylphosphinopropane bis P-oxide adduct
Tris 3-ethylpentane-2,4-dionato dysprosium bisdiphenylphosphinobutane bis P-oxide adduct
Tris 3-ethylpentane-2,4-dionato dysprosium diphenyl(triphenylphosphinaza)phosphine oxide adduct
Tris pivaloyltrifluoroacetonato dysprosium triphenylphosphine oxide adduct
Tris pivaloyltrifluoroacetonato dysprosium tritolylphosphine oxide adduct
Tris pivaloyltrifluoroacetonato dysprosium 1-naphthyldiphenylphosphine oxide adduct
Tris pivaloyltrifluoroacetonato dysprosium bisdiphenylphosphinoethane bis P-oxide adduct
Tris pivaloyltrifluoroacetonato dysprosium bisdiphenylphosphinopropane bis P-oxide adduct
Tris pivaloyltrifluoroacetonato dysprosium bisdiphenylphosphinobutane bis P-oxide adduct
Tris pivaloyltrifluoroacetonato dysprosium diphenyl(triphenylphosphinaza)phosphine oxide adduct
Tris trifluoroacetylacetonato dysprosium triphenylphosphine oxide adduct
Tris trifluoroacetylacetonato dysprosium tritolylphosphine oxide adduct
Tris trifluoroacetylacetonato dysprosium 1-naphthyldiphenylphosphine oxide adduct
Tris trifluoroacetylacetonato dysprosium bisdiphenylphosphinoethane bis P-oxide adduct
Tris trifluoroacetylacetonato dysprosium bisdiphenylphosphinopropane bis P-oxide adduct
Tris trifluoroacetylacetonato dysprosium bisdiphenylphosphinobutane bis P-oxide adduct
Tris trifluoroacetylacetonato dysprosium diphenyl(triphenylphosphinaza)phosphine oxide adduct
Tris hexafluoroacetylacetonato dysprosium triphenylphosphine oxide adduct
Tris hexafluoroacetylacetonato dysprosium tritolylphosphine oxide adduct
Tris hexafluoroacetylacetonato dysprosium 1-naphthyldiphenylphosphine oxide adduct
Tris hexafluoroacetylacetonato dysprosium bisdiphenylphosphinoethane bis P-oxide adduct
Tris hexafluoroacetylacetonato dysprosium bisdiphenylphosphinopropane bis P-oxide adduct
Tris hexafluoroacetylacetonato dysprosium bisdiphenylphosphinobutane bis P-oxide adduct
Tris hexafluoroacetylacetonato dysprosium diphenyl(triphenylphosphinaza)phosphine oxide adduct
Tris 6,6,7,7,8,8,8-heptafluoro-2,2-dimethyloctanedionato dysprosium triphenylphosphine oxide adduct
Tris 6,6,7,7,8,8,8-heptafluoro-2,2-dimethyloctanedionato dysprosium tritolylphosphine oxide adduct
Tris 6,6,7,7,8,8,8-heptafluoro-2,2-dimethyloctanedionato dysprosium 1-naphthyldiphenylphosphine oxide adduct
Tris 6,6,7,7,8,8,8-heptafluoro-2,2-dimethyloctanedionato dysprosium bisdiphenylphosphinoethane bis P-oxide adduct
Tris 6,6,7,7,8,8,8-heptafluoro-2,2-dimethyloctanedionato dysprosium bisdiphenylphosphinopropane bis P-oxide adduct
Tris 6,6,7,7,8,8,8-heptafluoro-2,2-dimethyloctanedionato dysprosium bisdiphenylphosphinobutane bis P-oxide adduct
Tris 6,6,7,7,8,8,8-heptafluoro-2,2-dimethyloctanedionato dysprosium diphenyl(triphenylphosphinaza)phosphine oxide adduct
Tris 1-phenyl-1,3-butanedionato dysprosium triphenylphosphine oxide adduct
Tris 1-phenyl-1,3-butanedionato dysprosium tritolylphosphine oxide adduct
Tris 1-phenyl-1,3-butanedionato dysprosium 1-naphthyldiphenylphosphine oxide adduct
Tris 1-phenyl-1,3-butanedionato dysprosium bisdiphenylphosphinoethane bis P-oxide adduct
Tris 1-phenyl-1,3-butanedionato dysprosium bisdiphenylphosphinopropane bis P-oxide adduct
Tris 1-phenyl-1,3-butanedionato dysprosium bisdiphenylphosphinobutane bis P-oxide adduct
Tris 1-phenyl-1,3-butanedionato dysprosium diphenyl(triphenylphosphinaza)phosphine oxide adduct

The invention claimed is:
1. Compounds of formula I:

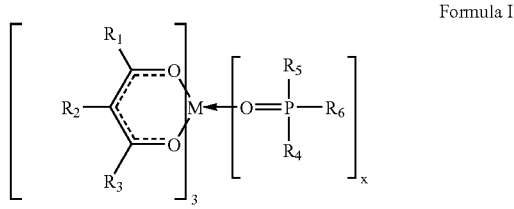

Formula I wherein
x is 1 or 2
M is selected from Europium, Terbium, Dysprosium and Samarium;
R1, R2 and R3 are independently of each other selected from phenyl, naphthyl,
H and C1-C6 branched or straight chain alkyl, thiophene and C1-C6 fluorinated alkyl wherein the fluorination may be in 1 or all positions or any intermediate value,
substituted phenyl wherein the substituents are independently selected from C1-C4 straight or branched chain alkyl, Cl, Br, F, I and the phenyl group may be substituted in 1, 2 or 3 positions;

R4 and R5 are independently of each other selected from phenyl, tolyl, naphthyl, C1-C6 branched or straight chain alkyl and substituted phenyl wherein the substituents are independently selected from C1-C4 straight or branched chain alkyl and the phenyl group may be substituted in 1, 2 or 3 positions;

R6 is selected from C1-C6 branched or straight chain alkyl and —(CH$_2$)$_n$P(O)R7 R8, wherein n=1 to 4, wherein R7 and R8 are independently selected from phenyl, naphthyl, C1-C6 branched or straight chain alkyl and substituted phenyl wherein the substituents are independently selected from C1-C4 straight or branched chain alkyl and the phenyl group may be substituted in 1, 2 or 3 positions, provided that when R4, R5, R7 and R8 are all selected from phenyl then X is 2 or R2 is other than H.

2. A compound according to claim 1, where R6 is selected from —(CH$_2$)$_n$P(O)R7 R8, wherein n=2 to 4, wherein R7 and R8 are independently selected from phenyl, naphthyl, C1-C6 branched or straight chain alkyl, and substituted phenyl wherein the substituents are independently selected from C1-C4 straight or branched chain alkyl and the phenyl group may be substituted in 1, 2 or 3 positions.

3. A compound according to claim 2 wherein when R6 is —(CH$_2$)$_n$P(O)R7 R8 then the O in R6 is coordinated to the M group.

4. A compound according to claim 2 wherein when R6 is —(CH$_2$)$_n$P(O)R7 R8 then the O in R6 is coordinated to another equivalent metal atom as a bridging group.

5. A compound according to claim 1 wherein

R1, R2 and R3 are independently of each other selected from phenyl, and C1-C4 branched or straight chain alkyl, R4 and R5 are independently of each other selected from phenyl, tolyl and C1-C6 branched or straight chain alkyl, R6 is selected from C1-C6 branched or straight chain alkyl, and 2-diphenylphosphinooxyethyl.

6. A method of producing a luminescent light output in a material, comprising the step of subjecting particles of the material to damage, fracture or strain so as to produce a triboluminescent effect, wherein said material is a compound of claim 1.

7. Triboluminescent paper comprising one or more triboluminescent materials given by claim 1 such that the paper triboluminesces when the paper is torn and/or pressed and/or gripped and/or folded.

8. A paper according to claim 7 wherein the triboluminescent material has been applied by one or more of the following methods:

in an adhesive composition, and/or in an encapsulant;

in a solvent followed by solvent evaporation;

by melting the triboluminescent material such that it soaks into the paper;

by incorporating the triboluminescent material together with the pulp, fibre during manufacture of the paper.

9. A paper according to claim 8 wherein the adhesive composition, and/or encapsulant is a polymer which is selected from the following;

acrylic resins, methacrylic resins, polyimides, polyamides, melamine/formaldehyde resins, urea formaldehyde resins, epoxy resins, poly(p-xylylene), gelatin, poly(lactic acid), polyester resins or alkyd resins.

10. A paper according to claim 8 wherein the adhesive composition may also comprise one or more of the following:

solvents, dispersants, plasticisers, curing agents, dyes, fillers, stabilisers, or anti-oxidants.

11. A product comprising the paper of claim 10.

12. A triboluminescent adhesive composition comprising an adhesive and one or more triboluminescent materials given by claim 1.

13. An adhesive tape which flashes light when used, comprising a substantially transparent substrate, an adhesive composition according to claim 12, optionally an adhesion promoter on the substrate and optionally a further laminating sheet on top of the adhesive composition before or after any drying stage.

14. A method for detecting tampering of a sealed article comprising the steps of:

coating a part of an unsealed article with an adhesive composition, sealing the article, wherein the adhesive composition further comprises one or more triboluminescent materials given by claim 1 such that on breaking the seal triboluminescence will be observed.

15. A damage-sensing device comprising at least one light sensor and at least one triboluminescent material given by claim 1.

* * * * *